Dec. 3, 1957 P. C. TILLMAN 2,814,882
GROOVE GAUGE
Filed Sept. 14, 1953
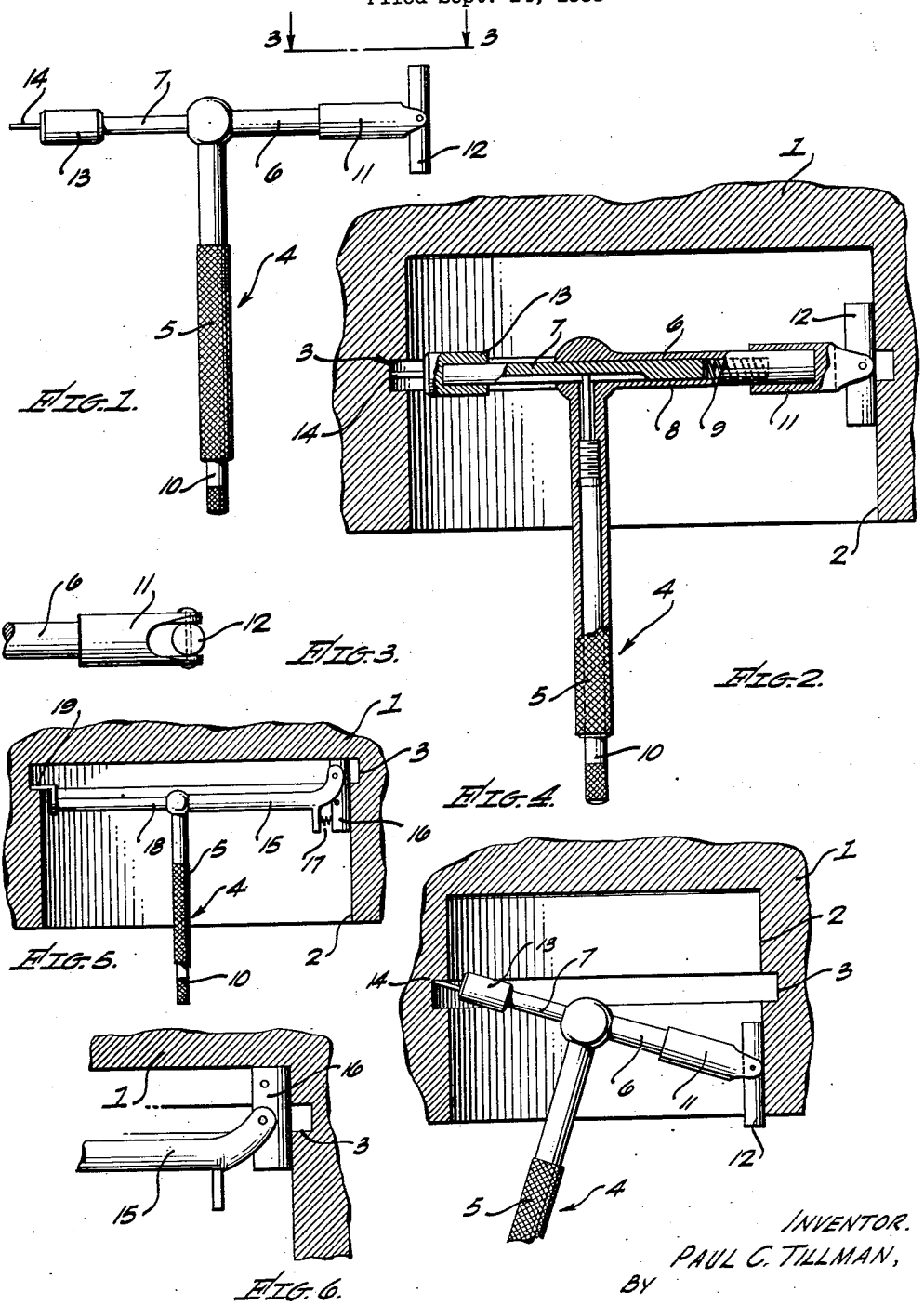
INVENTOR.
PAUL C. TILLMAN,
BY
ATTORNEY.

United States Patent Office 2,814,882
Patented Dec. 3, 1957

2,814,882
GROOVE GAUGE

Paul C. Tillman, Seal Beach, Calif., assignor to Paul C. Tillman Laboratories, Inc., Long Beach, Calif., a corporation of California Application September 14, 1953, Serial No. 380,016

2 Claims. (Cl. 33—143)

This invention relates to a groove gauge wherein an internal groove can be measured, that is, to provide a gauge to measure the depth of an internal groove.

An object of my invention is to provide a novel groove gauge of the telescoping type wherein it is possible to accurately measure the depth of an inside groove.

Another object of my invention is to provide a novel groove gauge of the character stated, which is very accurate and also is simple in construction and inexpensive to manufacture.

Other objects, advantages and features of invention may appear from the accompanying drawing, the subjoined detailed description and the appended claims.

In the drawing:

Figure 1 is a side elevation of my groove gauge.

Figure 2 is a side elevation of my groove gauge with parts broken away to show interior construction, the gauge being shown in operating position.

Figure 3 is an end view of an adapter for use on a telescoping gauge.

Figure 4 is a side elevation of my telescoping gauge as it is removed from the inside groove.

Figure 5 is a side elevation of a telescoping gauge embodying my invention and showing the gauge in operative position.

Figure 6 is a fragmentary side elevation of one end of the telescoping gauge as shown in Figure 5.

Referring more particularly to the drawing, the numeral 1 indicates a metal body of any type in which a bore 2 has been cut. It is frequently necessary to cut an annular groove 3 in the bore and it is necessary to determine the depth of this groove, frequently to a very accurate degree. In order to measure the depth of this groove I provide a telescopic type gauge 4 which includes a handle 5 and an arm 6 at the upper end thereof, the arm 6 projecting at right angles to the handle 5, substantially as shown. A second arm 7 fits into the bore 8 of the arm 6 and the arm 7 is pressed outwardly by the spring 9, as will be further described. A lock pin 10 is threaded into the handle 5 and the inner end of this pin presses against the arm 7 to hold this arm in any adjusted position relative to the arm 6, that is, the arm 7 can be pressed inwardly and held in this adjusted position by tightening the pin 10 against the arm.

Thus far a standard telescoping gauge has been described. However, this type of gauge will not determine the depth of the groove 3, since it cannot be removed from the bore 2 when the arms 6 and 7 are resting within the groove 3. To permit the depth of the groove 3 to be determined, I provide the following structure:

A sleeve 11 is slidably mounted on the outer end of the arm 6. A cylindrical foot 12 is pivotally mounted on the outer end of the sleeve 11 and this foot fits within the bore 2 and straddles the groove 3, as shown in Figure 2. A second sleeve 13 is fitted on to the outer end of the arm 7, as shown in Figure 1, and this latter sleeve is provided with an outwardly projecting pin 14 which can enter the groove 3, as shown in Figure 2.

The operation of the tool thus far described is as follows: The gauge is inserted, as shown in Figure 2, with the pin 14 resting on the bottom of the groove 3. The foot 12 bridges the groove 3 so that this foot may be withdrawn from the bore 2, as shown in Figure 4. Due to the fact that the foot 12 is pivoted to the sleeve 11, the gauge can be withdrawn from the bore 2 in the manner shown in Figure 4. When the gauge has been withdrawn, the distance from the outer surface of the foot 12 to the outer end of the pin 14 can be measured, and since the diameter of the bore 2 is already known, it is simple arithmetic to determine the depth of the groove 3.

In Figures 5 and 6, I have shown a modification of the groove gauge in which an arm 15 is formed or attached to the upper end of the handle 5. At the outer end of the arm 15 a foot 16 is pivotally attached and this foot may be either centrally pivoted on the end of the arm 15 or it can be eccentrically pivoted. In Figure 5 the use of the eccentric mounting is shown. In this arrangement the groove 3 may be at the end of the bore 2 and to determine the depth of the groove 3 the foot 16 may be eccentrically mounted. A spring 17 may bear against the foot 16 for the purpose of holding the foot against the bore 2. The telescoping arm 18 has a pin 19 eccentrically mounted on its outer end. The pin 19 enters the groove 3, as shown in Figure 5, and performs the same function as the pin 14, previously described. In Figures 5 and 6 the arms 15 and 18 are specially formed, whereas in Figures 1 to 4, inclusive, the usual telescopic gauge is used with the addition of the special sleeves on the arms of the gauge as described.

Having described my invention, I claim:

1. A groove gauge, including a handle, an arm extending at right angles from the handle, a second arm telescopically mounted in the first named arm and in axial alignment with the first named arm, a spring in the first named arm bearing against the second arm to press the second arm outwardly, a lock pin threaded in the handle, one end of the lock pin projecting from the handle, the other end of the lock pin engaging the second arm to lock the second arm, a cylindrical foot pivotally mounted on the outer end of the first named arm, said foot being of greater length than the diameter of the first named arm, and a pin projecting from the second arm, said pin being in axial alignment with the second arm.

2. A groove gauge, including a handle, an arm extending at right angles from the handle, a second arm telescopically mounted in the first named arm and in axial alignment with the first named arm, a spring in the first named arm bearing against the second arm to press the second arm outwardly, a lock pin threaded in the handle, one end of the lock pin projecting from the handle, the other end of the lock pin engaging the second arm to lock the second arm, a sleeve fitted on the outer end of the first named arm, a cylindrical foot pivotally mounted on the outer end of the sleeve, the length of said foot being greater than the diameter of said sleeve, a second sleeve fitted on the outer end of the second arm, and a pin projecting from the second sleeve, said pin being in axial alignment with the second arm.

References Cited in the file of this patent

UNITED STATES PATENTS

| 635,088 | Bowker | Oct. 17, 1899 |
| 762,971 | Woerner | June 21, 1904 |
| 1,655,133 | Clase | Jan. 3, 1928 |
| 1,970,092 | Hink | Aug. 14, 1934 |
| 2,006,013 | Claywell | June 25, 1935 |
| 2,352,313 | Fernwald | June 27, 1944 |
| 2,363,165 | Vierling | Nov. 21, 1944 |
| 2,496,655 | Balk | Feb. 7, 1950 |
| 2,607,123 | Sheridan | Aug. 19, 1952 |

FOREIGN PATENTS

| 312,970 | Germany | June 21, 1919 |
| 405,871 | Great Britain | Feb. 15, 1934 |